United States Patent [19]
Takahashi

[11] Patent Number: 5,518,119
[45] Date of Patent: May 21, 1996

[54] HEAT-SEAL PACKAGE AND METHOD OF PACKAGING

[75] Inventor: Masumi Takahashi, Matsudo, Japan

[73] Assignee: Kohjin Co., Ltd., Japan

[21] Appl. No.: 185,857

[22] PCT Filed: May 27, 1992

[86] PCT No.: PCT/JP92/00684

§ 371 Date: Jan. 25, 1994

§ 102(e) Date: Jan. 25, 1994

[87] PCT Pub. No.: WO93/24388

PCT Pub. Date: Dec. 9, 1993

[51] Int. Cl.$^6$ .............. B65D 71/08; B65D 65/28
[52] U.S. Cl. .............. 206/497; 53/442; 229/87.01; 229/87.05; 206/484
[58] Field of Search .............. 53/442, 441; 206/497, 206/484; 229/87.01, 87.05, 87.06

[56] References Cited

U.S. PATENT DOCUMENTS

| | | | |
|---|---|---|---|
| 3,093,448 | 6/1963 | Kirkpatrick et al. | 206/497 X |
| 3,404,508 | 10/1968 | Dreyfus | 206/497 X |
| 3,541,753 | 11/1970 | Katz | 53/442 |
| 4,178,401 | 12/1979 | Weinberg et al. | 206/497 X |
| 4,648,513 | 3/1987 | Newman | 383/204 |
| 4,700,528 | 10/1987 | Bernard | 206/497 X |
| 5,176,948 | 1/1993 | Nguyen et al. | 428/195 |

FOREIGN PATENT DOCUMENTS 2-258527  10/1990  Japan .

OTHER PUBLICATIONS

Kohjin Co. Ltd. Brochure, Concerning "KOHJINKORAP" with partial translation.
PACKPIA 1995/5 pp. 14–17 with partial translation.

Primary Examiner—Bryon P. Gehman
Attorney, Agent, or Firm—Pollock, Vande Sande & Priddy

[57] ABSTRACT

According to the present invention, in overwrapping an object to be packaged, the object is wrapped with a packaging material in such a manner as to form a tubular shape, which packaging material is heat-sealable on both sides thereof and, as required, has heat shrinkability or gas-barrier properties; the overlap portion of the packaging material is heat-sealed in a lap seal fashion: and an opening portion formed at each end of the lap seal line is heat-sealed. The lap-heat-sealed portion of the package thus obtained has a satisfactory strength with liquid leakage prevented, and the unevenness of this portion is inconspicuous. Further, respective sealed portions at both ends of the package exhibit a good appearance because of the absence of a folded portion. The resulting package is excellent in seal strength and appearance and hence highly valuable on a commercial basis. Further, where the packaging material is self-tacky and, at the same time, heat-sealable within the temperature range for heat shrinkage, exposing the package provisionally sealed by self-tackiness to a heating environment for heat shrinkage will give a package with heat sealing completely achieved during the heat shrink treatment without the need of an additional heat-sealing process for the provisionally-sealed portion.

18 Claims, 4 Drawing Sheets

HEAT-SEAL PACKAGE AND METHOD OF PACKAGING

TECHNICAL FIELD

The present invention relates to a method for overwrap-packaging an article using a packaging material which is heat-sealable on both sides thereof and to a resulting package. In particular, where the packaging material is both self-tacky and heat-shrinkable, the packaging material is provisionally sealed by virtue of its self-tackiness, then subjected to a heating environment for heat shrinkage, thereby obtaining a package with its provisionally-sealed portion completely heat-sealed by the heat shrink treatment without the need of an additional heat-sealing treatment.

BACKGROUND ART

Hitherto, various methods have been proposed and practically employed for overwrap-packaging an object with a plastic film.

For instance, packaging methods of the type which seals three sides of a package include one adapted to heat-seal all the three sides of a package by melt-cut sealing or band sealing (heat-sealing using a heating bar, heating continuous belt or heating disk edge to form a band-like sealed portion), one adapted to fin-heat-seal one of the three sides of a package and to melt-cut-seal or band-seal the two remaining sides thereof, and one adapted to electrostatic-seal one side of a package in a lap seal fashion and to melt-cut-seal or band-seal the two remaining sides thereof.

In addition, there is known a packaging method using a stretched film wherein one side of a package is lap-heat-sealed and the two remaining sides thereof are folded onto the bottom surface of the package and fixed thereto by heat sealing.

Such conventional methods, however, involve a problem that where packages each having a heat-sealed portion resulting from melt-cut sealing on the bottom surface thereof are transported or displayed in a stacked fashion, the melt-cut-sealed portion on the bottom surface of an upper package is brought into close contact with the top surface of the underlying package and rubbed thereby due to vibration or the like and is hence prone to rupture.

Although rupture of such kind is hard to occur if a package is fin-heat-sealed on the bottom surface thereof, another problem arises that since the fin-heat-sealed portion of the package is considerably thick and forms a projection on the bottom surface of the package, stacking this package on an object having, for example, a soft surface would frequently leave a mark of the sealed portion on the top surface of the underlying object.

With the package which is electrostatic-sealed on the bottom surface thereof in a lap seal fashion, the problem of the aforementioned marking will not arise because the sealed portion is thin and does not project so much. However, such a package suffers a problem that the sealed portion is likely to be unsealed since it is not fusion-bonded and a problem that if the package contains a liquid such as water or juice, such a liquid is easy to leak from the package. Further, in this case another problem is present that since the packaging material must be an electrostatically chargeable film, such a film is easy to collect dust due to static electricity and is inevitably poor in antifog properties.

Further, with the package using a stretched film wherein one side of the package is lap-heat-sealed and the two remaining sides thereof are folded onto the bottom surface of the package and fixed thereto by heat sealing, there is a drawback that the portions folded onto the bottom surface of the package are wrinkled and, hence, openings are left in the wrinkled portion to frequently permit a liquid to leak therethrough. In addition such a wrinkled portion degrades the appearance of the package.

DISCLOSURE OF THE INVENTION

The present invention has been attained as a result of intensive efforts to solve the foregoing various problems. According to the present invention, such problems are all solved by wrapping an object with a packaging material such as a wrapping film, forming an overlap portion of the packaging material on any one surface, for example, bottom surface, of the object, lap-heat-sealing the overlap portion and heat-sealing opening portions formed on opposite ends of the lap-heat-sealed portion.

Thus, the present invention is directed to a method for packaging an object which is employed in overwrapping the object, characterized by: covering the object with a packaging material in such a manner as to wrap the packaging material around the object, the packaging material being heat-sealable on both sides thereof; lap-heat-sealing the overlap portion of the packaging material; and sealing opening portions respectively formed at opposite ends of the lap-heat-seal line by heat sealing. The present invention is also directed to a package resulting from the above method.

The present invention uses as the packaging material a film which is heat-sealable on both sides thereof. More preferably, such a film is self-tacky at its surface, heat-shrinkable, or both stretchable and heat-shrinkable. The packaging material typically exhibits self-tackiness when surfaces thereof are brought into mutual and close contact with each other.

The film may be a single-layered film but preferably a multilayered film comprising a core layer and a sealant layer having heat-sealability on each side of the core layer. A film for the core layer may be imparted with gas barrier property, good modulas of elasticity, or other preferable characteristics suitable for the purpose of individual package. Examples of the film material forming each layer include polyolefin resins, vinyl chloride resins, polyamide resins and ethylene-vinyl alcohol resins. Nevertheless, any other materials may be used without particular limitations as far as they meet the above-mentioned requirements.

To be described next is a method for producing a package using the aforementioned packaging material according to the present invention.

An object to be packaged is wrapped with the aforementioned packaging material in such a manner as to form a tubular shape, followed by heat sealing of the overlapped ends of the packaging material by applying a heating bar heated to such a temperature as to allow heat sealing of the packaging material or by placing the overlapped ends onto a hot plate. The peripheral edge of each opening portion formed at each end of the tubular shape is flatly collapsed and then heat-sealed by melt-cut sealing, band sealing or the like.

In this case if the packaging material to be used has self-tackiness, the overlap portion and the opening portions at opposite ends which are formed when the object is tubularly wrapped with the packaging material are provisionally sealed by merely compressing the same. Hence, such provisionally-sealed portions will not be unsealed or shifted easily. This allows those opening portions to be heat-sealed directly or the overlap portion on the bottom surface of the package to be sealed directly by means of a hot plate or the like.

Alternatively, if the packaging material to be used has heat shrinkability, after heat-sealing the three portions, i.e. the overlap portion and the opening portions, the packaging film is made to shrink by allowing the package to pass through a heating furnace or to be exposed to hot air or hot water, whereby a package with tight appearance can be obtained.

Further, where the packaging material to be used is self-tacky, heat-sealable and heat-shrinkable and at the same time the heat-seal layer is heat-sealable within a temperature range suitable for heat shrinkage, the overlap portion on the bottom surface of the package and the opening portions at opposite ends are collapsed to achieve provisional sealing, and then the package is directly subjected to the heat shrink treatment without any particular heat-sealing process, thereby obtaining a shrink package with the packaging material completely heat-sealed while heat-shrinked during the heat shrink treatment.

If desired, suitable unsealability can be imparted to the package by providing the packaging material with a V-shaped notch or a cut line of perforations in a portion thereof contacting the object or in a portion thereof between each opening portion sealed and the object.

BEST MODE FOR CARRYING OUT THE INVENTION

The present invention will now be described more specifically by way of examples thereof.

Figure 1:
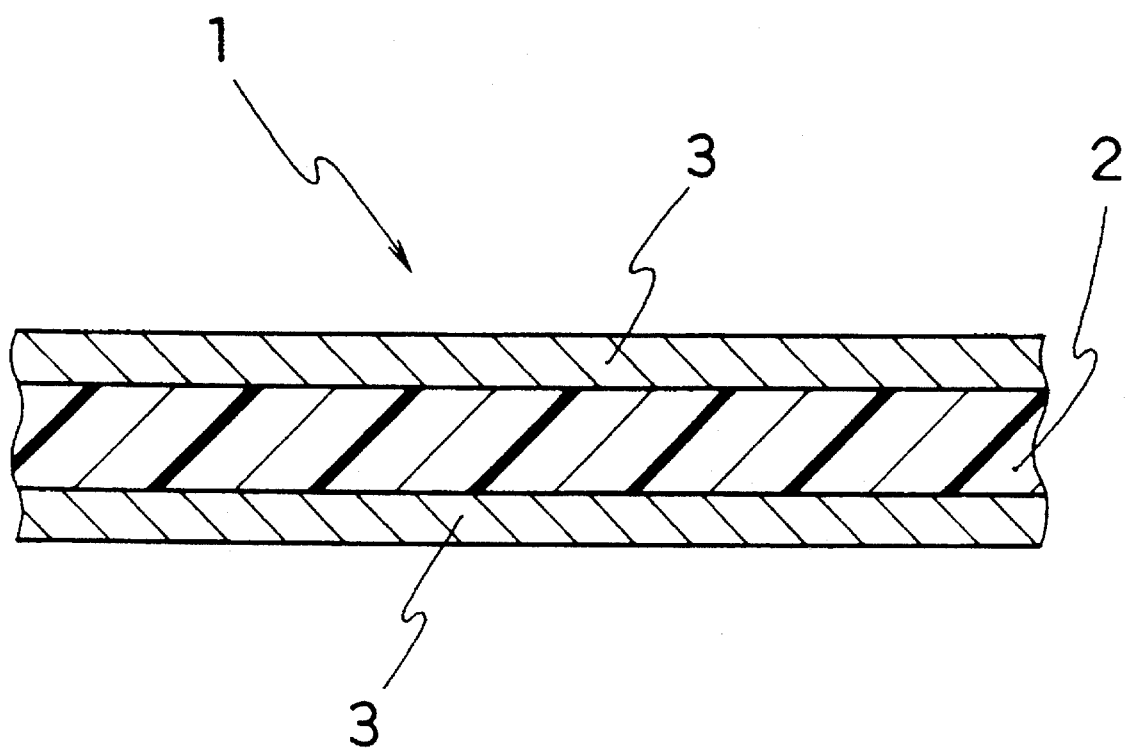
FIG. 1 is a partial sectional view showing an example of the packaging material used in the present invention.

Reference to FIG. 1 illustrates a packaging material 1 that is a three-layer film comprising a core layer 2 and a self-tacky, heat-sealable layer 3 laminated on each side of the core layer 2.

Figure 2:
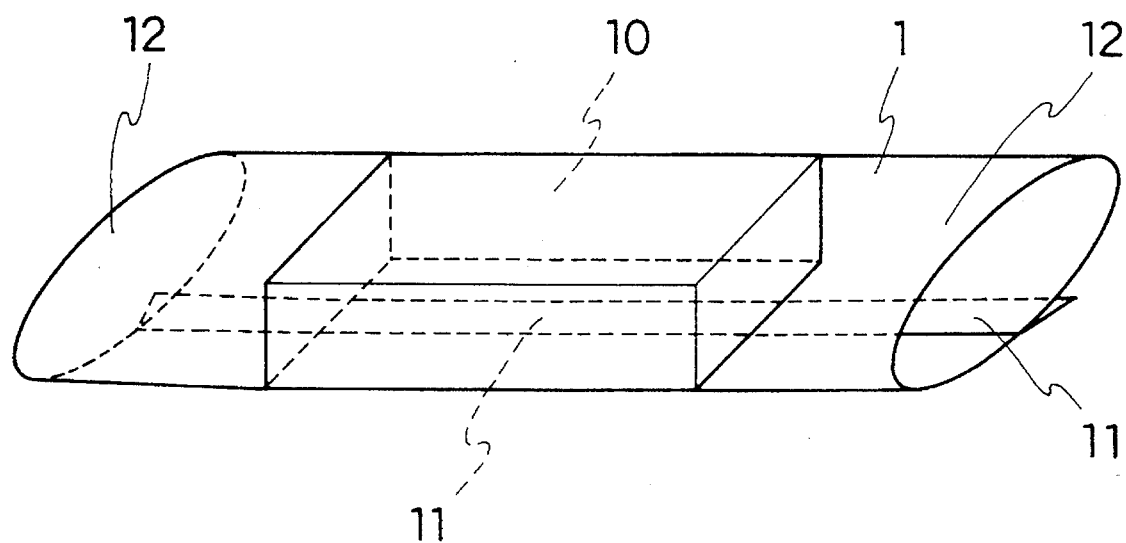
FIGS. 2–4 are perspective views showing an example of the packaging method of the present invention (hereinafter referred to as "Method 1") in order of steps.

As shown in FIG. 2, the packaging material 1 is wrapped around an object 10 to be packaged to form a tubular shape including an overlap portion 11 of the packaging material 1 in lap seal fashion and an opening portion 12 at each end of the overlap portion 11.

The overlapped ends of the packaging material 1 in the overlap portion 11 in lap seal fashion are stuck to each other by the self-tackiness of the packaging material 1 to provide provisional-sealing of the overlap portion 11. The opening portion 12 is pressed from above and from below to be provisionally-sealed by the self-tackiness of the packaging material 1.

Figure 3:
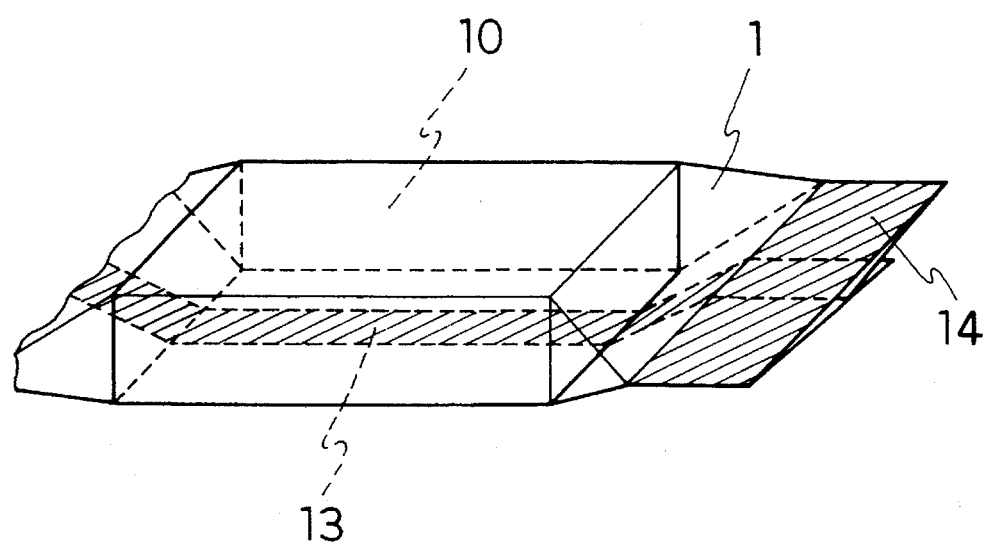

Thus, there is obtained a provisional package as shown in FIG. 3. In FIG. 3, hatched areas 13 and 14 are the thus provisionally-sealed portions.

Figure 4:
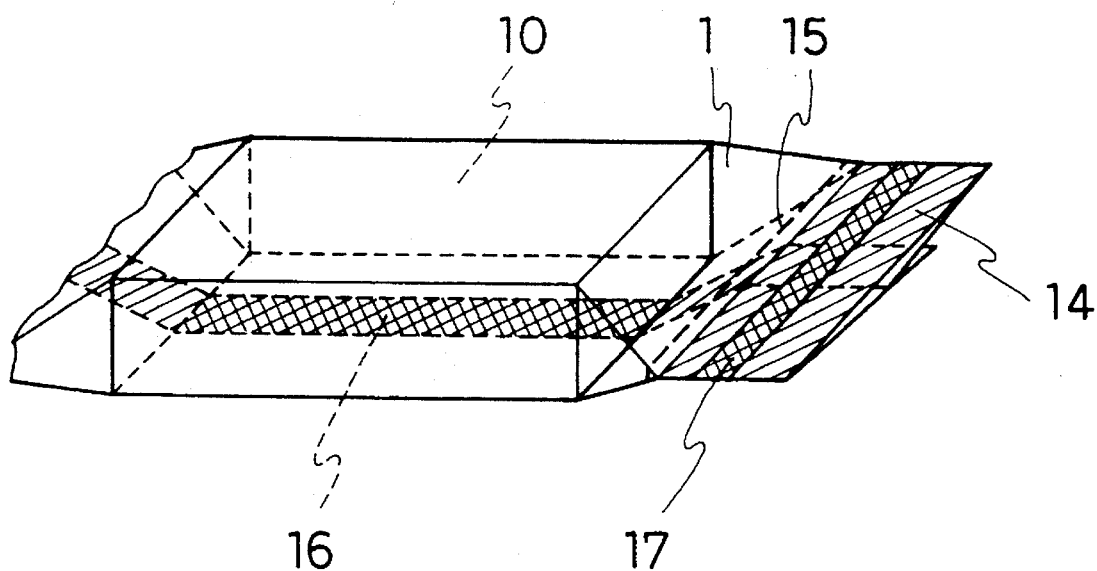

Then, as shown in FIG. 4, a cut line 15 of perforations is provided to the packaging material 1 by applying thereto a rotary perforation cutter at a location between each provisionally-sealed portion 14 and the object 10. The wrapped object is placed on a hot plate to allow secure heat-sealing of the provisionally-sealed portion 13 of the overlap portion 11 in lap seal fashion and the provisionally-sealed portion 14 of the opening portion 12 is securely heat-sealed by using a bar sealer, thus yielding a final package. In FIG. 4, a cross-hatched area 16 and a cross-hatched area 17 are the thus heat-sealed portions.

Figure 5:
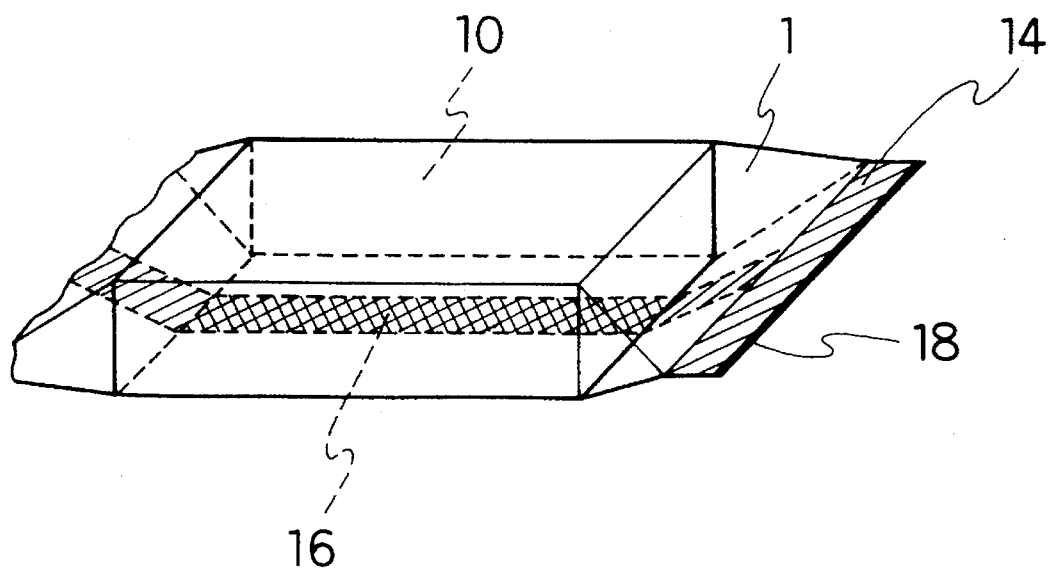
FIG. 5 is another example of the packaging method of the present invention.

In the method exemplified by FIG. 5, the provisionally-sealed portion 14 of the opening portion 12 shown in FIG. 3 is securely melt-cut-sealed. The melt-cut-sealed portion is indicated by numeral 18. The treatment of the provisionally-sealed portion 13 is the same as in Method 1.

Figure 6:
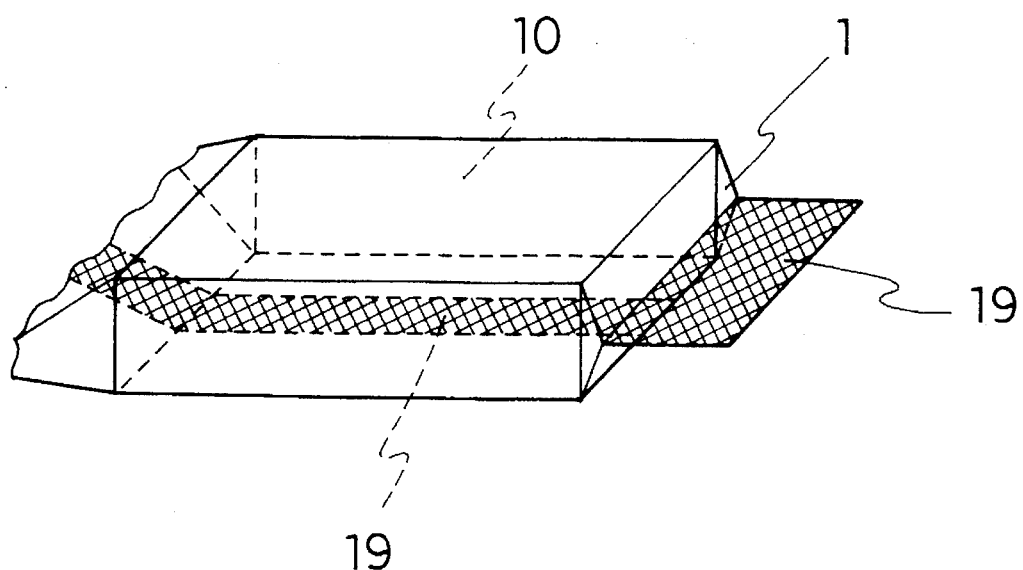
FIG. 6 is a further example of the packaging method of the present invention wherein a heat-shrinkable film is used as the packaging material 1.

In the method exemplified by FIG. 6, the provisional package shown in FIG. 3 is passed through a shrink tunnel so that the packaging material 1 is shrunk and the provisionally-sealed portions 13 and 14 are securely heat-sealed by the heat of the shrink tunnel to give a final package. In FIG. 6, the cross-hatched area 19 is the portion heat-sealed by the heat of the shrink tunnel.

Figure 7:
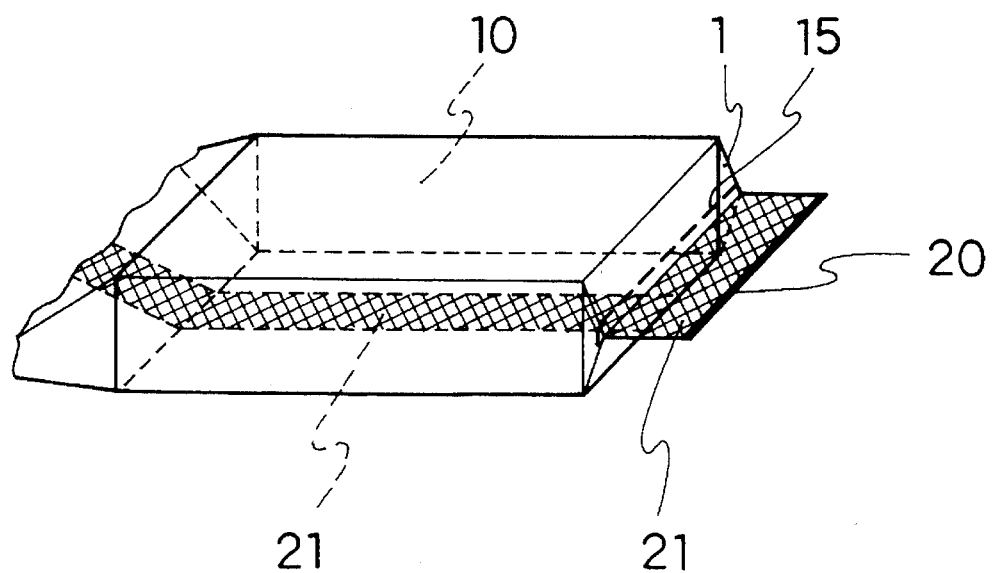
FIG. 7 is a still further example of the packaging method of the present invention wherein a heat-shrinkable film is used as the packaging material 1.

In the method exemplified by FIG. 7, a cut-line 15 of the perforations is provided in the provisional package shown in FIG. 3 and the provisionally-sealed portion 14 is melt-cut-sealed. The resultant article is then passed through a shrink tunnel to give a final package. In FIG. 7, the melt-cut-sealed portion is indicated by numeral 20 and the cross-hatched area 21 is the portion heat-sealed by the heat of the shrink tunnel.

EXAMPLE 1

As a packaging material there was used a stretchable, heat-shrinkable, polyolefin-based, multilayered film having a width of 25 cm and a thickness of 13 μ (KOHJINKORAP, a product of Kohjin Co., Ltd.), the heat shrinkage percentage of the film being 40% in both longitudinal and transverse directions at 100° C. The film was wrapped around a polypropylene tray having a length of 10 cm in the longitudinal direction, a length of 18 cm in the transverse direction and a height of 1.5 cm, on which 160 g of pickles were placed, as an object to be packaged, in the transverse direction of the tray. The film was then cut to have an overlap portion having a width of about 30 mm and extending centrally of the bottom surface of the tray. The resulting wrapped object was placed upon a hot plate at 100° C. for one second to allow heat sealing of the overall area of the overlap portion in a lap heat seal fashion. In turn, an opening portion formed at each end of the lap heat sealed portion was collapsed, then heat-sealed at a location adjacent art end of the tray by melt-cut sealing using a knife of 1.5 mmR at 180° C.

The resulting package was heated for two seconds by passing it through a hot-air tunnel heated at 110° C. to give a shrink package.

Packages of the type thus obtained were stacked one upon another up to six stages within a cardboard box, then subjected to a vibration test for 40 minutes by placing the box on a flat board adapted to reciprocate 50 times per minute at an amplitude of 20 cm. As a result, the lap-heat-sealed area on the bottom surface of each of the packages was found to be uniformly transparent and smooth with no rupture of seal. Further, the melt-cut-sealed portion of each selvage exhibited a clear-cut appearance, and the package did not permit the juice of pickles to leak therefrom no matter how inclined. The shrink package thus obtained was a commercial package which was excellent in appearance, strength and liquid-tight property.

EXAMPLE 2

As a packaging material there was used an ethylene-vinyl alcohol-based multilayered film of barrier properties having a width of 27 cm and a thickness of 14 μm, the film comprising a 2 μm-thick EVOH film layer and a 6 μm-thick polyethylene film layer laminated on each side of the EVOH film layer. The film was wrapped around a polypropylene tray having a length of 12 cm in the longitudinal direction, a length of 20 cm in the transverse direction and a height of 2.0 cm, on which 200 g of chilled hamburger was placed, as an object to be packaged, in the transverse direction of the tray. The film was then cut to have an overlap portion having a width of about 20 mm and extending centrally of the bottom surface of the tray. The resulting wrapped object was directly placed upon a hot plate at 100° C. for two seconds to allow heat-sealing of the overall area of the overlap portion in a lap heat seal fashion. In turn, an opening portion formed at each end of the lap-heat-sealed portion was pressed to be collapsed, then heat-sealed at a location adjacent an end of the tray using a 5 mm-wide bar sealer heated at 110° C.

The package thus obtained was subjected to the same test as in Example 1 for 40 minutes. As a result, the lap-heat-sealed area on the bottom surface of the package was found to be uniformly transparent and smooth with no rupture of seal. Further, the bar-sealed portion in each selvage portion was found to be sealed securely. Consequently, the package thus obtained was a commercial package which was excellent in appearance, strength and barrier properties.

EXAMPLE 3

As a packaging material there was used a stretchable, heat-shrinkable, polyethylene-based, multilayered film, the film comprising a 10.4 μm-thick core layer formed of a linear low-density polyethylene resin having a melting point of 126° C. (a main peak by DSC measurement ) and a heat shrinkage initiating temperature of 80° C. and, laminated on each side of the core layer, a 1.3 μ m-thick, self-tacky, heat-sealable layer formed of a mixture of 49% by weight of a linear low-density polyethylene resin having a melting point of 80° C. (the same as the above), 49% by weight of the linear low-density polyethylene resin used in the core layer and 2% by weight of a tackifier (ARKON P115, a product of Arakawa Chemical Co.), the heat-seal initiating temperature of the heat-seal layer being 70° C. The film was wrapped around a lunch box of polypropylene filled with a variety of lunch foods (Makunouchi Bento), as an object to be packaged, in the transverse direction of the lunch box. The film was cut to have an overlap portion of 15 mm in width on the bottom surface of the lunch box. The overlapped ends of the wrapping film were stuck to each other by the self-tackiness of the film. In turn, a tubular opening portion formed at each end of the box was pressed from above and from below to be closed by self-tackiness of the film, thereby obtaining a provisional package. A cut line of perforations was then provided to the packaging material by applying thereto a rotary perforation cutter at a location spaced by 5 mm from the lunch box between each closed end of the packaging material and the lunch box. The thus obtained provisional package was passed through a 100° C. hot air shrink tunnel for two seconds. The resulting package was a complete package with its provisionally sealed portions at the bottom surface and opposite ends thereof being securely heat-sealed by the heat of the shrink tunnel.

The thus obtained package was subjected to a vibration test for 40 minutes in the same manner as in Example 1. As a result, the package was found to have the overlap portion and closed end portions securely sealed with no rupture of seal.

When this package was held by hands and the opposite end portions thereof were pulled outwardly by hands, the packaging material was cut easily along the cut line of perforations to allow removal of the lunch box with ease.

COMPARATIVE EXAMPLE 1

Using a packaging material and an object to be packaged which were completely identical with those used in Example 1, the film was wrapped around the tray in the transverse direction of the tray and the film was heat-sealed by melt-cut sealing so as to have a seal line extending centrally of the bottom surface of the tray. In turn, an opening portion formed at each end of the tray by the heat-sealing on the bottom was collapsed, then heat-sealed at a portion adjacent an end of the tray by melt-cut sealing.

The resulting package was heated for six seconds by passing it through a hot-air tunnel heated at 120° C. to give a shrink package.

Packages of the type thus obtained were stacked one upon another up to six stages within a cardboard box, then subjected to a vibration test for 40 minutes by placing the box on a flat board adapted to reciprocate 50 time per minute. As a result, some packages were each found to have a pinhole-like rupture in a portion of the heat-sealed portion in the bottom surface of the package because of friction with the top surface of the underlying package due to vibration. When these packages were inclined at various angles, juice was found to ooze from the pinhole.

The shrink package thus obtained was one which was incomplete in strength and in liquid-tight properties.

COMPARATIVE EXAMPLE 2

As a packaging material there was used an electrostatic-chargeable, heat-shrinkable, polypropylene-based film of 28 cm in width and 15 μ thickness (KOHJINPOLYSET, a product of Kohjin Co., Ltd.). The film was wrapped around a polypropylene tray having a length of 10 cm in the longitudinal direction, a length of 18 cm in the transverse direction and a height of 1.5 cm, on which 160 g of pickles were placed, as an object to be packaged, in the transverse direction of the tray. The film was cut to have an overlap portion having a width of about 30 mm and extending centrally of the bottom surface of the tray. The overall area of the overlap portion on the bottom was allowed to be electrostatic-sealed in a lap seal fashion. In turn, an opening portion formed at each end of the electrostatic-lap-sealed area was collapsed, then heat-sealed at a location adjacent an end of the tray by melt-cut sealing.

The resulting package was heated for six seconds by passing it through a hot-air tunnel heated at 160° C. to give a shrink package.

Packages of the type thus obtained were stacked one upon another up to six stages within a cardboard box, then subjected to a vibration test for 40 minutes by placing the box on a flat board adapted to reciprocate 50 times per minute at an amplitude of 20 cm. As a result, the electrostatic-lap-sealed area on the bottom surface of some packages was found to have some exfoliation though seemed to be transparent and smooth. Variously inclining these packages resulted in ooze of juice of pickles therefrom.

The thus obtained shrink package was one which had a problem of sealability and liquid-tight properties at the electrostatic-sealed portion on the bottom surface thereof.

COMPARATIVE EXAMPLE 3

In a manner similar to that of Example 1 except that the packaging material was 34 cm wide, a tubularly wrapped object was given as having a lap-heat-sealed portion on the bottom surface thereof. An opening portion formed at each end of the heat-sealed area was collapsed and folded onto the bottom surface. The wrapped object with its packaging material thus folded was placed upon a hot plate heated at 100° C. to fix the folded portions to the bottom surface of the package by fusion bonding, thereby achieving sealing.

The package thus obtained was found to have a bottom surface exhibiting not so good appearance. Further, variously inclining this package resulted in ooze of juice of the packaged object from the folded and fixed portion on the bottom surface thereof. This package when displayed as a commercial article had a degraded value on a commercial basis due to its appearance.

INDUSTRIAL APPLICABILITY

According to the present invention, in overwrapping an object to be packaged, the object is wrapped with a packaging material in such a manner as to form a tubular shape, which packaging material is heat-sealable on both sides thereof and, as required, has heat shrinkability or gas-barrier properties; the overlap portion of the packaging material is heat-sealed in a lap seal fashion; and an opening portion formed at each end of the lap seal line is heat-sealed. The lap-heat-sealed portion of the package thus obtained has a satisfactory strength with liquid leakage prevented, and the unevenness of this portion is inconspicuous. Further, respective sealed portions at both ends of the package exhibit a good appearance because of the absence of a folded portion. The resulting package is excellent in seal strength and appearance and hence highly valuable on a commercial basis. Further, where the packaging material is self-tacky and, at the same time, heat-sealable within the temperature range for heat shrinkage, exposing the package provisionally sealed by self-tackiness to a heating environment for heat shrinkage will give a package with heat sealing completely achieved during the heat shrink treatment without the need of an additional heat-sealing process for the provisionally-sealed portion.

I claim:

1. A method for packaging an object which is employed in overwrapping the object, comprising: wrapping a sheet of packaging material around an object to form a tubular shape, wherein the sheet of packaging material provides both self-tackiness and heat-sealability on each side thereof; pressing an overlap portion of said sheet of packaging material in a lap seal fashion and an opening portion at each end of the overlap portion to provisionally seal these portions by the self-tackiness thereof, thereby giving a provisional package; and heat-sealing the provisionally-sealed portions.

2. The method of claim 1, wherein said sheet of packaging material is stretchable.

3. The method of claim 1, wherein the sheet of packaging material is a multi-layer film.

4. The method of claim 1, wherein the provisionally-sealed opposite ends of the overlap portion are sealed by melt-cut sealing.

5. The method of claim 1, which further comprises after obtaining the provisional package, providing a line of perforations in a portion of the sheet of packaging material between a portion where the sheet of packaging material contacts the object and at least one of the provisionally-sealed portions at opposite ends of the overlap portion.

6. A method for packaging an object which is employed in overwrapping the object, comprising: wrapping a sheet of packaging material around an object to form a tubular shape, wherein said sheet of packaging material is heat-shrinkable and provides self-tackiness and heat-sealability on each side thereof, the heat-sealability being provides within a temperature range suited for heat shrinkage of said sheet of packaging material; pressing an overlap portion of the sheet of packaging material in a lap seal fashion and an opening portion formed at each end of the overlap portion to provisionally seal these portions by the self-tackiness thereof, thereby giving a provisional package; and subjecting said provisional package to a heat shrink treatment under heat shrink conditions of the sheet of packaging material while at the same time heat-sealing the portions of the provisional package which have been provisionally-sealed by the self-tackiness thereof.

7. The method of claim 6, wherein the sheet of packaging material is stretchable.

8. The method of claim 6, wherein the sheet of packaging material is a multi-layer film.

9. The method of claim 6, which further comprises after obtaining the provisional package and prior to the heat shrink treatment, providing a line of perforations in a portion of the sheet of packaging material between a portion where the sheet of packaging material contacts the object and at least one of the provisionally-sealed portions at opposite ends of the overlap portion.

10. A package comprising an object packaged with a sheet of packaging material which provides self-tackiness and heat-sealability on each side thereof, the package obtained by wrapping the sheet of packaging material around the object to form a tubular shape; pressing an overlap portion of the sheet of packaging material in lap seal fashion and an opening portion at each end of the overlap portion to provisionally seal these portions by the self-tackiness thereof, thereby giving a provisional package; and heat-sealing the provisionally-sealed portions.

11. The package of claim 10, wherein the sheet of packaging material is stretchable.

12. The package of claim 10, wherein the sheet of packaging material is a multi-layer film.

13. The package of claim 10, wherein the provisionally-sealed opposite ends of the overlap portion are sealed by melt-cut sealing.

14. The package of claim 10, which further comprises after obtaining the provisional package, providing a line of perforations in a portion of the sheet of packaging material between a portion where the sheet of packaging material contacts the object and at least one of the provisionally-sealed portions at opposite ends of the overlap portion.

15. A package comprising an object packaged with a sheet of packaging material which is heat-shrinkable and which provides self-tackiness and heat-sealability on each side thereof, the heat-sealability being provided within a temperature range suited for heat shrinkage of the packaging material, the package obtained by wrapping the sheet of packaging material around the object to form a tubular shape; pressing an overlap portion of the sheet of packaging material in a lap seal fashion and an opening portion formed at each end of the overlap portion to seal these portions provisionally by the self-tackiness thereof, thereby giving a provisional package; and subjecting the provisional package to a heat shrink treatment under heat shrink conditions of the sheet of packaging material while at the same time heat-sealing the portions of the provisional package which have been provisionally-sealed by the self-tackiness thereof.

16. The package of claim 15, wherein the sheet of packaging material is stretchable.

17. The package of claim 15, wherein the sheet of packaging material is a multi-layer film.

18. The package of claim 15, which further comprises after obtaining the provisional package and prior to the heat shrink treatment, providing a line of perforations in a portion of the sheet of packaging material between a portion where the sheet of packaging material contacts the object and at least one of the provisionally-sealed portions at opposite ends of the overlap portion.

* * * * *